(12) United States Patent
Gastaldi et al.

(10) Patent No.: US 10,017,662 B2
(45) Date of Patent: Jul. 10, 2018

(54) FIRE-RESISTANT MOSAIC TESSERAE

(71) Applicant: S.E. SPECIAL ENGINES S.r.l., Turin (IT)

(72) Inventors: Maurizio Gastaldi, Turin (IT); Alberto Menozzi, Turin (IT); Silvia Gastaldi, Turin (IT)

(73) Assignee: S.E. SPECIAL ENGINES S.R.L., Turin (IT)

( * ) Notice: Subject to any disclaimer, the term of this patent is extended or adjusted under 35 U.S.C. 154(b) by 196 days.

(21) Appl. No.: 14/893,531

(22) PCT Filed: May 27, 2014

(86) PCT No.: PCT/IB2014/061756
§ 371 (c)(1),
(2) Date: Nov. 24, 2015

(87) PCT Pub. No.: WO2014/191919
PCT Pub. Date: Dec. 4, 2014

(65) Prior Publication Data
US 2016/0090506 A1   Mar. 31, 2016

(30) Foreign Application Priority Data

May 28, 2013 (IT) .............................. TO2013A0425

(51) Int. Cl.
| | | |
|---|---|---|
| *C09D 175/04* | (2006.01) | |
| *C09D 5/18* | (2006.01) | |
| *C08G 18/48* | (2006.01) | |
| *C08G 18/72* | (2006.01) | |
| *C08G 18/75* | (2006.01) | |
| *C08G 18/42* | (2006.01) | |
| *C08J 7/04* | (2006.01) | |
| *B44F 11/04* | (2006.01) | |
| *C08K 11/00* | (2006.01) | |
| *C09D 7/40* | (2018.01) | |
| *C08K 3/34* | (2006.01) | |
| *C08K 3/36* | (2006.01) | |
| *C08K 3/22* | (2006.01) | |
| *C08K 5/00* | (2006.01) | |

(52) U.S. Cl.
CPC ............ *C09D 175/04* (2013.01); *B44F 11/04* (2013.01); *C08G 18/4277* (2013.01); *C08G 18/4825* (2013.01); *C08G 18/722* (2013.01); *C08G 18/755* (2013.01); *C08G 18/758* (2013.01); *C08J 7/047* (2013.01); *C08K 11/00* (2013.01); *C09D 5/18* (2013.01); *C09D 7/67* (2018.01); *C08J 2323/02* (2013.01); *C08J 2327/06* (2013.01); *C08J 2367/02* (2013.01); *C08J 2475/04* (2013.01); *C08K 3/22* (2013.01); *C08K 3/346* (2013.01); *C08K 3/36* (2013.01); *C08K 5/005* (2013.01); *C08K 5/0016* (2013.01); *C08K 2003/2227* (2013.01); *C08K 2201/011* (2013.01)

(58) Field of Classification Search
CPC ............................ C09D 175/04; C08G 18/722
See application file for complete search history.

(56) References Cited

U.S. PATENT DOCUMENTS

| | | | | |
|---|---|---|---|---|
| 5,470,623 A * | 11/1995 | Lucas | .................... | B44C 3/123 |
| | | | | 428/192 |
| 7,270,891 B2 * | 9/2007 | Roth | ...................... | B64G 1/226 |
| | | | | 204/192.1 |
| 2006/0228525 A1* | 10/2006 | Dakowski | ........... | B29C 33/3835 |
| | | | | 428/172 |
| 2008/0206507 A1* | 8/2008 | Allen | ....................... | B32B 9/02 |
| | | | | 428/53 |
| 2012/0256143 A1 | 10/2012 | Ulcar et al. | | |

FOREIGN PATENT DOCUMENTS

| | | |
|---|---|---|
| CA | 2486829 A1 | 5/2006 |
| WO | 0214443 A2 | 2/2002 |
| WO | 2009143001 A2 | 11/2009 |
| WO | 2010056182 A1 | 5/2010 |
| WO | 2011050520 A1 | 5/2011 |

* cited by examiner

*Primary Examiner* — Betelhem Shewareged
(74) *Attorney, Agent, or Firm* — Robert E. Alderson, Jr.

(57) ABSTRACT

Mosaic tesserae comprising a substrate having a visible face covered with a coating layer of transparent material are provided. This coating layer has a fire resistance of at least CLASS B according to standard EN ISO 11925, improved abrasion resistance and transmittance of radiation with a wavelength between about 400 and about 800 nm equal to at least 80%. Methods of making mosaic tesserae which exhibit these features are also provided.

8 Claims, No Drawings

FIRE-RESISTANT MOSAIC TESSERAE

CROSS-REFERENCE TO RELATED APPLICATIONS

This application is a National Phase Application of PCT International Application No. PCT/IB2014/061756, International Filing Date, May 27, 2014, claiming priority to Italian Patent Application No. TO2013A000425 (102013902160159), filed May 28, 2013 each of which is hereby incorporated by reference in its entirety.

FIELD OF THE INVENTION

The present invention relates to the production of a transparent resin coating for mosaic tesserae.

BACKGROUND OF THE INVENTION

Typically, these tesserae have a substrate of plastic material that adheres by means of glue to a base of silicone-coated paper. The visible face of the substrate is submitted to a process of digital printing to print desired images thereon, which are finally coated with a layer of transparent resin, which functions as protection and at the same time imparts gloss.

SUMMARY OF THE INVENTION

The aim of the present invention is to provide a tessera of the type stated above having improved properties that extend its possible applications, in particular with a view to use in public buildings with fire safety constraints.

This aim is achieved with mosaic tesserae as described and claimed herein which include a substrate having a visible face covered with a coating layer of transparent material, said coating layer having a fire resistance of at least CLASS B according to standard EN-ISO 11925, improved abrasion resistance, and transmittance of radiation with a wavelength between about 400 and about 800 nm equal to at least 80%.

DETAILED DESCRIPTION

The aforementioned substrate is of plastic material—especially of PVC, polyester or polyolefin—whose visible face has been submitted to a process of digital printing to print desired images thereon and then coated with a coating with a polyurethane resin matrix.

The transparent coating is a formulation that gives a combination of properties in terms of transparency, abrasion resistance, and flame retardancy, particularly suitable for use as coating of the aforementioned mosaic tesserae.

According to the invention, this formulation, which constitutes a further object of the present invention, comprises:
  from 10 to 30 parts of monomeric aliphatic isocyanate,
  from 30 to 60 parts of polyol,
  from 10 to 30 parts of diol,
  from 0.5 to 3 parts of nano-additive for abrasion resistance,
  from 1 to 3 parts of nano-additive for flame resistance, and
  from 5 to 25 parts of aliphatic or aryl-aliphatic phosphorus-based plasticizer.

Advantageously, this formulation further comprises from 3 to 10 parts of ammonium phosphate.

All the parts indicated in the present disclosure have to be intended as parts by weight.

In the present description the term "nano-additive" means an additive present in the form of particles, whose diameter (or equivalent diameter in the case of non-spherical particles) is between 5 and 100 nm.

The material obtained from the formulation of the invention—which has a polyurethane resin matrix—is able to pass the tests ASTM E1354, ISO 5660 and EN ISO 11925, so that it satisfies the requirements for application in buildings, in particular in buildings open to the public, requiring prolonged flame resistance or reduced generation of heat during combustion, so as to guarantee that those present have an adequate period of time for evacuation of the site.

The material obtained from the formulation of the invention has a hardness between 30 and 80 Shore D, preferably between 60 and 75 Shore D, and sufficient abrasion resistance to endure treatments of cleaning with coarse cloths, abrasive sponges, and liquid detergents with mineral fillers of varying coarseness.

Advantageously, the isocyanate used is IPDI (isophorone diisocyanate) and/or HMDI (dicyclohexylmethylene diisocyanate), and the polyol used is a polyether polyol, of the polypropylene glycol type, or a polyester polyol (polycaprolactones).

The nano-additive for abrasion resistance is selected from the group consisting of $SiO_2$, $Al_2O_3$ and mixtures thereof, while the nano-additive for flame resistance is selected from the group consisting of $Al(OH)_3$, nano-clays and mixtures thereof.

The reaction of formation of the polyurethane is promoted by the presence in the formulation of from 0.1 to 0.5 parts of catalyst, especially organic salts of bismuth and zinc or mercury.

The formulation of the invention can comprise from 0.2 to 2 parts of anti-UV additive, such as triazines or benzotriazoles, and/or from 0.2 to 2 parts of HALS additive (Hindered Amine Light Stabilizers). These additives impart good resistance to UV radiation and to solar ageing, avoiding yellowing.

The formulation of the invention can further comprise up to 10 parts of chain extender, such as butanediol, ethyl hexanediol, and/or up to 20 parts of HDI trimer.

A preferred method of production of a material suitable for use as transparent coating of a mosaic tessera of the invention based on the aforementioned formulations envisages preparing a first mixture including polyol, nano-additive for abrasion resistance, nano-additive for flame resistance, plasticizer, ammonium phosphate, anti-UV additive, HALS additive, chain extender and catalyst, and, separately, a second mixture including isocyanate, diol and trimer, and then mixing the two aforementioned mixtures in a weight ratio between 1:1 and 2:1 until a transparent material with polyurethane resin matrix is obtained. It goes without saying that the optional ingredients do not necessarily have to be present.

This material, once polymerized, maintains perfect transparency (i.e. transmittance to light above 80% in the visible wavelength range 400-800 nm), good resistance to UV radiation and to solar ageing, and improved abrasion resistance and flame resistance.

This advantageous combination of properties is clearly shown in the following table, which compares the results of tests performed on materials obtained both from the formulation of the invention given above and from a standard comparison formulation consisting essentially of just the ingredients necessary for the reaction of formation of an aliphatic polyurethane.

| Characteristics | Comparison | Invention |
|---|---|---|
| Transmittance to light | Between 400-800 nm → 90% | Between 400-800 nm → 80% |
| UV resistance (QUV-A 2000 h exposure - SAE J2020 | No yellowing and no loss of gloss | No yellowing and no loss of gloss |
| Fire resistance according to EN ISO 11925 | Class E | Class B |
| Abrasion resistance Crock-meter according to ASTM D6279 (500 cycles → evaluation of light transmittance) | 70% | 75% |

As can be seen, significant improvements are obtained in terms of fire resistance and abrasion resistance at the cost of a modest loss of transmittance, which does not compromise the properties of transparency.

The material of the invention can therefore be used advantageously as coating of mosaic tesserae with conditions and methods that are conventional per se, similar to those used hitherto.

Naturally, without prejudice to the principle of the invention, the details of carrying it out and the embodiments can be varied widely relative to what has been described purely as an example, while remaining within its scope.

The invention claimed is:

1. A mosaic tessera comprising a substrate of plastic material having a visible face which has been subjected to a process of digital printing to print desired images thereon and covered with a coating layer of transparent material, said coating layer having a fire resistance of at least CLASS B according to standard EN ISO 11925, a hardness between 30 and 80 Shore D to impart abrasion resistance and a transmittance of radiation with a wavelength between about 400 and about 800 nm equal to at least 80%, said coating layer being produced from a formulation comprising:
   from 10 to 30 parts of monomeric aliphatic isocyanate,
   from 30 to 60 parts of polyol,
   from 10 to 30 parts of diol,
   from 0.5 to 3 parts of a nano-additive for abrasion resistance, selected from the group consisting of $SiO_2$, $Al_2O_3$ and mixtures thereof,
   from 1 to 3 parts of a nano-additive for flame resistance, selected from the group consisting of $Al(OH)_3$, nano-clays and mixtures thereof, and
   from 5 to 25 parts of aliphatic or aryl-aliphatic phosphorus-based plasticizer, wherein the nano-additives are present in the form of particles having a diameter between 5 and 100 nm.

2. The tessera of claim 1, in which said isocyanate is IPDI and/or HMDI and/or said polyol is of the polyether polyol or polyester polyol type.

3. The tessera of claim 1, wherein said substrate is of polyvinyl chloride, polyester or polyolefin.

4. The tessera of claim 1, wherein said formulation further comprises from 0.2 to 2 parts of an anti-UV additive and/or from 0.2 to 2 parts of hindered amine light stabilizers additive.

5. The tessera of claim 1, wherein said formulation further comprises from 0.1 to 0.5 parts of catalyst of the reaction of formation of the polyurethane, in particular organic salts of bismuth and zinc or mercury.

6. The tessera of claim 1, wherein said formulation further comprises up to 10 parts of a chain extender.

7. The tessera of claim 1, wherein said formulation further comprises from 3 to 10 parts of ammonium phosphate.

8. The tessera of claim 4, wherein the anti-UV additive comprises triazines or benzotriazoles.

* * * * *